United States Patent
Carlson et al.

(12) 
(10) Patent No.: US 6,509,959 B1
(45) Date of Patent: Jan. 21, 2003

(54) POTTING COMPOUND FOR FABRICATION OF FIBER OPTIC GYRO SENSOR COIL AND METHOD FOR FABRICATING SENSOR COIL

(75) Inventors: Kurt Randy Carlson, Northridge, CA (US); Amado Cordova, Woodland Hills, CA (US); John P. Rahn, West Hills, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/525,215

(22) Filed: Mar. 14, 2000

Related U.S. Application Data

(62) Division of application No. 09/124,803, filed on Jul. 29, 1998, now Pat. No. 6,054,068.

(51) Int. Cl.[7] .............................. G02B 6/04; C08L 83/00
(52) U.S. Cl. ..................... 356/12; 356/134; 524/403; 524/439; 524/588; 528/34
(58) Field of Search ................................. 524/588, 403, 524/439; 356/459, 12, 134; 528/34

(56) References Cited

U.S. PATENT DOCUMENTS

| | | | |
|---|---|---|---|
| 4,435,214 A | | 3/1984 | Ehrreich |
| 5,060,114 A | | 10/1991 | Feinberg et al. |
| 5,321,593 A | | 6/1994 | Moates |
| 5,371,593 A | | 12/1994 | Cordova et al. |
| 5,432,303 A | * | 7/1995 | Turek et al. ............. 174/259 |
| 5,546,482 A | | 8/1996 | Cordova et al. |
| 5,852,092 A | | 12/1998 | Nguyen |
| 5,859,105 A | | 1/1999 | Nguyen |
| 5,928,569 A | * | 7/1999 | Reo |
| 5,978,221 A | * | 11/1999 | Sawa et al. |
| 6,128,168 A | * | 10/2000 | Arnold et al. |

OTHER PUBLICATIONS

"Contemporary Polymer Chemistry, second edition"; Allcock et al., (1990) Prentice Hall, Englewood Cliffs, NJ 07632, p. 202.*

Printed information from Ames Goldsmith internet site.*

Printed information from Brookfield Engineering internet site.*

* cited by examiner

Primary Examiner—Robert Dawson
Assistant Examiner—Marc S Zimmer
(74) Attorney, Agent, or Firm—Snell & Wilmer LLP

(57) ABSTRACT

A potting compound for use in the fabrication of fiber optic gyro sensor coils utilizes a silver-filled silicone base to reduce gyro sensitivity to changes in heat rate and thereby improve gyro performance during warm-up and periods of thermal cycling.

15 Claims, 1 Drawing Sheet

POTTING COMPOUND FOR FABRICATION OF FIBER OPTIC GYRO SENSOR COIL AND METHOD FOR FABRICATING SENSOR COIL

CROSS-REFERENCE TO RELATED APPLICATION

This application is a divisional of application Ser. No. 09/124,803 filed on Jul. 29, 1998, now U.S. Pat. No. 6,054,068, for same title.

BACKGROUND OF THE INVENTION

1. Field of the Invention

The present invention relates to fiber optic gyroscopes and more particularly pertains to a potting compound for use and fabrication of the fiber optic sensor coil of a gyroscope and method of making a potted fiber optic gyro sensor coil.

2. Description of Related Art

An interferometric fiber gyroscope includes the main components of 1. a light source, 2. two beam splitters, 3. a fiber optic sensing coil made of either polarization maintaining (PM) fiber or a low birefringence (standard telecommunications) fiber, 4. a polarizer (sometimes more than one) and 5. a detector for light from a light source is split by loop beam splitter into counter-propagating waves traveling in the sensing coil. The associated electronics measure the phase relationship between the two interfering counter-propagating beams of light that emerge from opposite ends of the coil. The difference between the phase shifts experienced by the two beams is proportional to the rate of rotation of the platform to which the instrument is fixed, due to the well known Sagnac effect.

Environmental factors can affect the measured phase shift difference between the counter-propagating beams, thereby introducing an error, such environmental factors include variables, such as temperature, vibration and magnetic fields. In general, such factors are unevenly distributed throughout the coil. These environmental factors induce variations in the optical light path that each counter-propagating wave encounters as it travels through the coil. The phase shifts induced upon the two waves are unequal, producing an undesirable phase shift which is indistinguishable from the rotation-induced signal.

Past approaches to reducing some of the sensitivities arising from environmental factors, have involved the use of potting compound, to pot the windings of the sensor coil within a matrix of an adhesive material. Such an approach is described in U.S. Pat. No. 5,321,593 for "Sensor Coil for Low Bias Fiber Optic Gyroscope", assigned to the assignee of the present application and U.S. Pat. No. 5,546,482 for "Potted Fiber Optic Gyro Sensor Coil for Stringent Vibration and Thermal Environments", also assigned to the assignee of the present invention, both disclosures being incorporated herein by reference.

Although, the approaches described in these patents have alleviated some of the sensitivity problems resulting from the noted environment factors, undesirable sensitivities still exist. The sensor electronics utilized with the fiber optic gyro sensor coil to measure the phase relationship between the two counter-propagating beams of light in the coil, generate heat. The heat from the electronics provide thermal gradients in the gyro assembly. When the rate of heating is constant the component temperature changes, but the thermal gradients themselves remain constant. However, when the rate of heating changes or fluctuates as it does during warm-up of the gyroscope and at times during thermal cycling, these gradients become time varying. These time varying gradients within the fiber optic gyro sensor coil, lead to false time varying inertial angle readings for the gyroscope. These false readings limit the sensitivity of the gyro, and tend to mask its performance.

SUMMARY OF THE INVENTION

The foregoing short comings and disadvantages of the prior art are alleviated by the present invention that provides a potting compound for fabrication of a fiber optic gyro sensor coil that has a high thermal conductivity due to use of a silver-filled silicone which reduces gyro sensitivity to changes in heating rate thereby improving gyro performance during warm-up and thermal cycling.

BRIEF DESCRIPTION OF THE DRAWINGS

The preceding and other features, advantages and objects of the invention will become readily apparent from the detailed description that follows, when considered in conjunction with the accompanying drawings wherein like reference numerals designate like parts throughout the figures thereof and wherein.

DETAILED DESCRIPTION OF THE PREFERRED EMBODIMENTS

Figure 1:
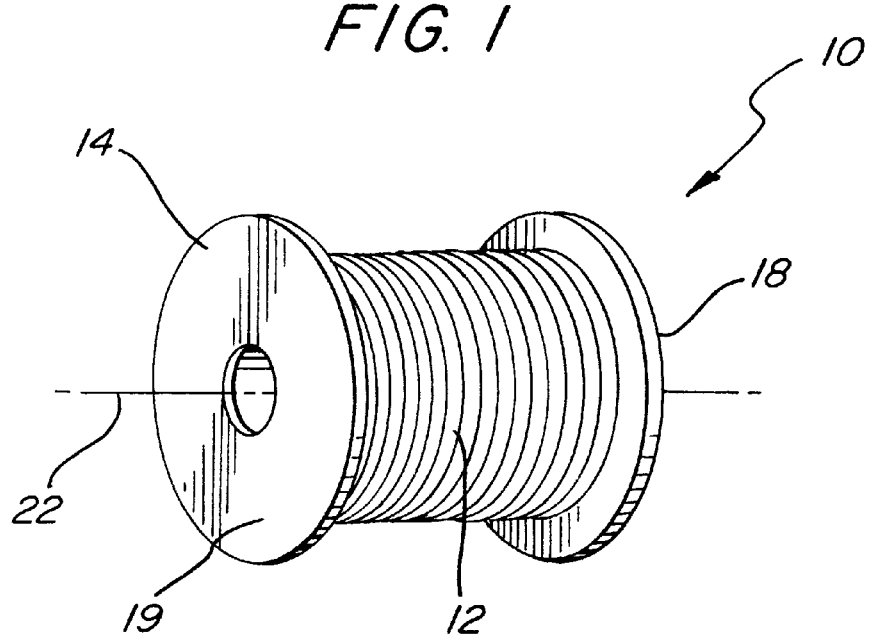
FIG. 1, is perspective view of a sensor coil for a fiber optic gyroscope in accordance with the invention.

Turning to the drawings, FIG. 1 is perspective view of a sensor coil 10, in accordance with the present invention. The sensor coil 10 provides a critical element of a fiber optic gyro system. In use it is rigidly fixed to a platform whose rotation rate is to be measured.

The sensor coil 10 comprises an optical fiber 12 that is wound upon a supportive spool 14. The coil 10 serves as an optical guide for receiving a counter-propagating beam pair emitted from a common light source (not shown). The supportive spool 14 includes end flanges 18, 19.

The spool 14 is preferably made of carbon composite or of any other material of similar thermal mechanical properties, such as disclosed in U.S. Pat. No. 5,321,593, for example, including woven carbon fibers such as commercially available from AMACO Corporation, under the trade names P-25, P-55 or P-105. The spool 14 is formed of these fibers that have been built up into multiple fiber layer tubes or sheets by means of a bonding matrix of, for example, phenolic material. The spool 14 can be formed from such tubes or sheets by a number of known processes, including for example, cutting sections therefrom. Alternatively, the woven fiber can be arranged into predetermined orientation and shapes in a dye and the bonding material cast around it. Another process uses transfer molding in which the chopped fiber is mixed with transfer molding material and then transfer or pressured injected into a transfer mold. The fibers are preferably oriented at right angles within the bonding matrix material aligned both longitudinally and circumferentially with respect to the spools' axis of rotation 22. This arrangement of the fibers is intended to insure that spool 14 will expand symmetrically both longitudinally and radially with temperature.

Figure 2:
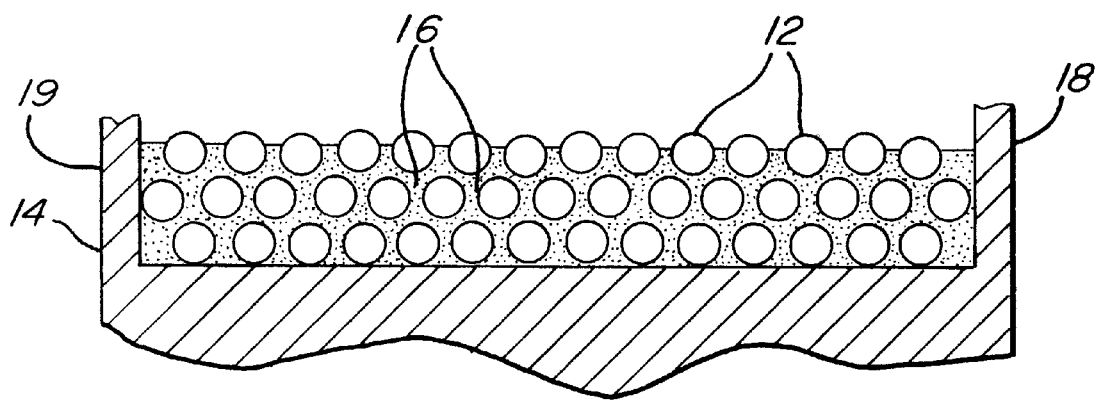
FIG. 2, is an enlarged cross sectional view of the representative portion of a layered windings of a sensor coil in accordance with the present invention.

FIG. 2, is an enlarged cross-sectional view of a representative portion of the layered windings of optical fiber 12. The windings of optical fiber 12 are potted within a matrix of adhesive material 16. Generally, the presence of such adhesive material 16 provides a number of useful advantages for the gyroscope. These include facilitating the precision of coil winding, that is the adhesive potting material 16 can be applied and cured by layer so that smooth surfaces will be presented for the winding of subsequent layers. Such a winding environment enhances control of the resulting coil geometry, including such essential factors as inter-fiber spacing, turns per layer, and layers per coil, and minimizes winding defects such as a missing turns.

A preferred manufacturing method according to the present invention is to wind the fiber 12 on to hub 14 which has flanges 18 and 19, one on each side. As the coil 12 is wound, adhesive is dispensed on to the fibers layer, by layer, by means of a syringe-type dispenser, for example. After curing, the fibers are bonded together forming an integral coil of solid mass. The coils are permanently bonded to only one of the flanges 19, for example. The other flange may be removed and reused with each new coil winding 18.

While coil potting provides numerous benefits, the selection of the potting material 16 and its method of application can itself affect gyro performance significantly. In particular, the selection of the adhesive product material 16 can Significantly reduce errors due to temperature effects.

Error angle sensitivity in a fiber optic gyro sensor coil undergoing temperature gradient changes is often expressed in terms of gyro bias sensitivity or degrees/hour/($°$ C./min$^2$). The theory which explains time-dependent error angles as it relates to changing thermal gradients is know as Tdotdot Shupe. It is a time-varying Type of Shupe bias, which was first proposed by D. M. Shupe in an article entitled "Thermally induced non-reciprocity in the fiber-optic interferometer", in Applied Optics, Vol. 19, pp. 294–295, (1980). The theory of Tdotdot Shupe seems to indicate that the thermal conductivity of the materials used to fabricate the coil is related to the time-dependent errors caused by changing thermal gradients. By increasing thermal conductivity of the coil Tdotdot Shupe and sensitivity to changes in heating rate is reduced proportionally.

The potted fiber optic gyro sensor coil consists primarily of the optical fiber and the potting compound. The thermal conductivity of the overall coil is a function of both of these elements. Since, the optical fiber is purchased and must be used "as received", improvements of the overall coil thermal conductivity must be directed to improving the potting compound. The material currently being utilized is a carbon-filled silicone which has a room temperature thermal conductivity of about 0.351 watts per meter Kelvin (W/m-K) yielding about 0.25 watts/m-K for the overall coil. The potting compound, of the present invention, a silver-filled silicone, has a room temperature thermal conductivity of about 1.4 W/m-K, or about 1.2 W/m-K for the coil. This is a 4-fold improvement in thermal conductivity. One can expect a corresponding reduction in Tdotdot Shupe or sensitivity to changes in heating rate.

Gyro performance is generally assessed by thermal cycling in a test chamber and reading the inertial error angles directly with the aid of software. From the resulting sample data, a root means square (RMS) value is determined, and the overall performance assessed. In this way, the sensitivity of different gyros can be directly compared. Coils potted with the silver-filled material of the present invention were thermally cycled and their data compared with standard carbon filled silicone material. The results were in line with the 4-fold improvement in thermal conductivity indicated above.

Typically, a coil potting compound is formulated by selecting a suitable resin system with the desired fillers to impart the necessary thermal conductivity. Modifiers are added to improve for tailor selected characteristics such as rate of cure and adhesion. The fillers can be supplied in various forms, such as fine powder, special granular forms or flakes. The fillers can be any one of a number of materials such as diamond, synthetic diamond, metals, metal oxides and nitrides. Each filler material has its advantages and disadvantages.

A consideration is a trade off between the viscosity of the resin and its thermal conductivity. Increasing the filler content can increase conductivity but the resulting viscosity may make it unsuitable for the intended application. Another problem with the fillers on the market are that they are often supplied with a coating on the surface of the filler material. This coating is part of the manufacturing process and imparts the necessary lubricating quality to the particulars to make them producible. A properly selected coating can improve wetting and suspension within the resin. The coating may or may not be organic and it may be soluble in the resin. Solubility is important in applications where high electrical conductivity is required. Coatings that are not soluble can interfere with the conductivity of the final product. Moreover, the coating on filler material can sometimes interfere with the curing mechanism. For example, platinum cured silicones are particularly susceptible to cure inhibition. Selecting the proper coating on the filler material therefore is an important factor in determining the formulation.

Through extensive testing and trial and error experimentation, the inventors herein have obtained a formulation for silver-filled silicone potting compound that meets the very strict criteria set forth hereafter. The base resin, a two part silicone is preferable is a resin known as General Electric RTV 655, part A in an amount within the range of about 20–25 percent by weight. The filler material is silver flakes that are approximately 20–22 microns thick nominally mixed into the base resin material at approximately 75–80 percent by weight. In addition to these main components the formulation preferably includes an inhibitor to retard the cure rate of the potting compound to match the length of the manufacturing process. The inhibitor preferred is Tetravinyltetramethylcyclotetrasiloxane, such as sold under the brand name Gelest SIT7900.1 at about 0.05% by weight. Besides the inhibitor, a wetting agent to promote adhesion to the fiber and the flange of the coil is preferred. The preferred wetting agent is Organofunctional reactive silane, Vinyltrimethoxy, such as sold under the trade name Dow Q9-6300 at approximately 0.1% by weight.

This formulation results in a potting compound that is ideally suited for use with fiber optic gyro sensor coils, for the specific purpose of reducing the sensitivity of the gyro to changes in heat rate. In order to obtain optimum performance from the potting compound it is found best to partially cure the potted fiber optic gyro sensor coil at room temperature. Thereafter, full cure in an air circulating oven is recommended. If the compound cures at least partially at room temperature, coil stress and the likelihood for cracking is reduced, when it comes to the operating temperature extremes of the sensor coil. An oven cure final step is necessary to achieve optimum properties of the potting compound in a timely manner. It has been found that a cure cycle of 12 hours at room temperature followed by 16 hours in a air circulating oven, at 70° C. provides satisfactory results.

The viscosity of the filled resin and the potting compound should be less than 25,000 centipoise throughout its work life. This requirement means that before the addition of fillers, the base resin will probably have a viscosity of less than 3,000 centipoise, measured at a temperature of 24±0.5 degrees Celsius and a shear rate of 1.55±0.05 cm/second. Increasing the filler concentration improves thermal conductivity. However, the upper limit on working viscosity determines how much filler can be added. The work viscosity limit is set by the method of potting, the desired work life and by physical factors such as wetting the fiber. If the viscosity is too high, the resin may not wet and coat the fiber during winding.

The cure rate of the resin must be slow enough at room temperature to permit completion of the winding and potting procedure. Yet, the cure rate should not be so slow as to cause slumping (i.e., run off the beads) which would interfere with subsequent operations. The winding and potting procedure preferred takes approximately 4 hours. Therefore, the viscosity of the potting compound must not exceed 25,000 centipoise after 4 hours.

During its working life the potting compound must remain flexible at temperatures down to −65° C. At such low temperatures many elastomers become hard. Studies have shown that this increased hardness effects gyroscope performance. It is therefore preferred that the base resin have no phase changes, e.g., a glass transition temperature ($T_g$), down to the coldest operating temperature (−65° C.). Silicones and some polyurethanes have low phase change temperatures. The reason for such a low phase change temperature is to avoid using a potting material that demonstrates abrupt changes in stiffness (i.e., thermal expansion and elastic modulus) with temperature. The potting material must have consistent behavior during thermal cycling on the temperature down-ramp as well as the up-ramp. Using a phase change temperature below the lowest operating temperature of the gyroscope, insures consistent behavior.

A problem encountered during the sensor coil fabricating process is that some potting compounds do not wet the fiber jacket well. The presently used optical fiber jacket material, an acrylated-epoxy, is generally very difficult to wet. A silicone resin base, although flexible at low temperatures does not wet acrylics well. For this reason, a wetting agent, such as Dow Corning Q9-6300 must be added to promote adhesion of the potting compound to the optical fiber and the sensor coil flange.

While this invention, has been described with reference to its presently preferred embodiment, it is not limited thereto. This invention is limited only so far as defined by the following set of patent claims, and includes within its scope all the equivalence thereof.

What is claimed is:

1. A compound comprising:
    a silicon base resin having a viscosity of less than 3,000 centipoise, measured at a temperature of 24±0.5 degrees Celsius and a shear rate of 1.55±0.5 cm/second, prior to mixing with a filler;
    a silver filler; and,
    an inhibitor having Tetravinyltetramethylcyclotetrasiloxane.

2. The potting compound of claim 1, wherein the inhibitor comprises about 0.05% by weight of the potting compound.

3. A potting material for a sensor coil for a fiber optic gyroscope operating in a predetermined temperature range, comprising:
    a silicon base resin having a phase change below the lowest operating temperature of the sensor coil;
    a silver filler for increasing the thermal conductivity of the potting compound; and,
    a wetting agent.

4. The potting compound of claim 3, wherein the wetting agent comprises approximately 0.1% by weight of the potting compound.

5. A fiber optic gyroscope sensor coil comprising:
    a spool with a circumference; and,
    a plurality of windings of optical fiber potted about the circumference of the spool with a potting compound;
    said potting compound comprising a silicon base resin and a silver filler.

6. The fiber optic gyroscope sensor coil of claim 5 wherein the silver filler comprises silver flakes.

7. The fiber optic gyroscope sensor coil of claim 5 wherein the silver filler is approximately 75 to 80 percent by weight of the potting compound.

8. The fiber optic gyroscope sensor coil of claim 5 wherein the base resin is approximately 20 to 25 percent by weight of the potting compound.

9. The fiber optic gyroscope sensor coil of claim 5 wherein the potting compound further comprises an inhibitor.

10. The fiber optic gyroscope sensor coil of claim 5 where the spool has at least one flange, wherein the plurality of windings of optical fiber are bonded to at least one flange by the potting compound.

11. The fiber optic gyroscope sensor coil of claim 5 where the plurality of windings of optical fiber are potted in at least two circumferential layers about the spool.

12. The fiber optic gyroscope sensor coil of claim 5 where the plurality of windings of optical fiber and potting compound are bonded together to form an integral coil of solid mass.

13. The fiber optic gyroscope sensor coil of claim 5 wherein the potting compound further comprises a wetting agent.

14. The fiber optic gyroscope sensor coil of claim 5 wherein the potting compound has a thermal conductivity of about 1.4 W/m-K.

15. The fiber optic gyroscope sensor coil of claim 5 wherein the silicon base resin has a phase change below the lowest operating temperature of the sensor coil.

* * * * *